United States Patent
Codrescu et al.

(10) Patent No.: US 7,702,889 B2
(45) Date of Patent: Apr. 20, 2010

(54) SHARED INTERRUPT CONTROL METHOD AND SYSTEM FOR A DIGITAL SIGNAL PROCESSOR

(75) Inventors: Lucian Codrescu, Austin, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 11/253,906

(22) Filed: Oct. 18, 2005

(65) Prior Publication Data

US 2007/0088938 A1    Apr. 19, 2007

(51) Int. Cl.
G06F 9/00    (2006.01)

(52) U.S. Cl. ...................... 712/244; 712/220

(58) Field of Classification Search .......... 712/244, 712/220

See application file for complete search history.

(56) References Cited

U.S. PATENT DOCUMENTS

| | | | |
|---|---|---|---|
| 4,689,739 A | | 8/1987 | Federico et al. |
| 4,901,307 A | | 2/1990 | Gilhousen et al. |
| 5,103,459 A | | 4/1992 | Gilhousen et al. |
| 5,193,187 A | | 3/1993 | Strout et al. |
| 5,305,455 A | * | 4/1994 | Anschuetz et al. .......... 718/100 |
| 5,410,708 A | | 4/1995 | Miyamori |
| 5,524,250 A | * | 6/1996 | Chesson et al. ............. 712/228 |
| 5,805,922 A | | 9/1998 | Sim et al. |
| 5,848,278 A | | 12/1998 | Sakai |
| 6,032,245 A | | 2/2000 | Georgiou et al. |
| 6,061,710 A | | 5/2000 | Eickemeyer et al. |
| 6,108,781 A | | 8/2000 | Jayakumar |
| 6,163,829 A | | 12/2000 | Greim et al. |
| 6,233,599 B1 | * | 5/2001 | Nation et al. ............... 718/102 |
| 6,253,304 B1 | | 6/2001 | Hewitt et al. |
| 6,260,057 B1 | * | 7/2001 | Eykholt et al. .............. 718/102 |
| 6,317,820 B1 | | 11/2001 | Shiell et al. |

(Continued)

FOREIGN PATENT DOCUMENTS

WO    02082278    10/2002

(Continued)

OTHER PUBLICATIONS

Microsoft Press Computer Dictionary, 2nd Edition; Joanne Woodcock, Senior Contributor, Oct. 1993.*

(Continued)

Primary Examiner—Eddie P Chan
Assistant Examiner—Idriss N Alrobaye
(74) Attorney, Agent, or Firm—Peter M. Kamarchik; Nicholas J. Pauley; Sam Talpalatsky

(57) ABSTRACT

Techniques for the design and use of a digital signal processor, including (but not limited to) processing transmissions in a communications (e.g., CDMA) system. The disclosed method and system process interrupts arising in a multi-threaded processor by receiving in an interrupt register a plurality of interrupts of a statistically indeterminate interrupt type and then associating a plurality of processing threads with the interrupt register for receiving the interrupt from the interrupt register. The method and system mask at least a subset of the plurality of processing threads so as to receive within each of the threads within the subset only ones of the plurality of interrupts of one or more predetermined types, thereby controlling on a per thread basis the processing of the plurality of interrupts according to the mask associated with a particular thread.

26 Claims, 5 Drawing Sheets

U.S. PATENT DOCUMENTS

| | | | |
|---|---|---|---|
| 6,381,676 B2* | 4/2002 | Aglietti et al. | 711/133 |
| 6,480,818 B1* | 11/2002 | Alverson et al. | 703/26 |
| 6,848,097 B1* | 1/2005 | Alverson et al. | 717/124 |
| 6,971,103 B2* | 11/2005 | Hokenek et al. | 718/107 |
| 7,065,633 B1* | 6/2006 | Yates et al. | 712/227 |
| 7,120,783 B2* | 10/2006 | Fotland et al. | 712/228 |
| 7,124,283 B2 | 10/2006 | Yamada et al. | |
| 7,203,823 B2* | 4/2007 | Albuz et al. | 712/229 |
| 2001/0052053 A1* | 12/2001 | Nemirovsky et al. | 711/138 |
| 2002/0103847 A1* | 8/2002 | Potash | 709/107 |
| 2002/0144004 A1* | 10/2002 | Gaur et al. | 709/310 |
| 2002/0161957 A1* | 10/2002 | Comeau et al. | 710/260 |
| 2003/0154234 A1* | 8/2003 | Larson | 709/107 |
| 2003/0225955 A1 | 12/2003 | Feldstein et al. | |
| 2004/0073910 A1* | 4/2004 | Hokenek et al. | 719/310 |
| 2005/0050305 A1 | 3/2005 | Kissell | |
| 2006/0037020 A1* | 2/2006 | Accapadi et al. | 718/102 |
| 2006/0130061 A1* | 6/2006 | Bauer et al. | 718/100 |
| 2006/0206902 A1 | 9/2006 | Jamil et al. | |
| 2006/0218559 A1 | 9/2006 | Muhammad et al. | |
| 2008/0091867 A1 | 4/2008 | Plondke et al. | |

OTHER PUBLICATIONS

Modern Dictionary of Electronics, 6th Edition, Jul. 1996, Rudolf F. Graf.*
Microsoft Computer dictionary fifth edition May 25, 2002.*
Academic Press Dictionary of Science and Technology. Oxford: Elsevier Science and Technology. 1992.*
International Search Report-PCT/US05/040759-ISA-EPO-May 24, 2007.
Written Opinion-PCT/US05/040759-ISA-EPO-May 24, 2007.
Scott Rosenthal "Interrupts Might Seem Basic, But Many Programmers Still Avoid Them", SLTF Consulting, May 1995.

* cited by examiner

SHARED INTERRUPT CONTROL METHOD AND SYSTEM FOR A DIGITAL SIGNAL PROCESSOR

FIELD

The disclosed subject matter relates to data communications. More particularly, this disclosure relates to a novel and improved shared interrupt control method and system for a digital signal processor.

DESCRIPTION OF THE RELATED ART

Increasingly, electronic equipment and supporting software applications involve signal processing. Home theatre, computer graphics, medical imaging and telecommunications all rely on signal-processing technology. Signal processing requires fast math in complex, but repetitive algorithms. Many applications require computations in real-time, i.e., the signal is a continuous function of time, which must be sampled and converted to digital, for numerical processing. The processor must thus execute algorithms performing discrete computations on the samples as they arrive. The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communication between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "$3_{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard.

Because DSPs are intended for operation in real-time systems, efficient, sophisticated, and predictable interrupt handling is critical to a DSP. Context switches should be very fast. Advanced DSPs, like floating-point family support complete sets of alternative registers, allowing a single-cycle switch of context to support interrupt handling. An advanced DSP may support at least four or more independent external interrupts in addition to internal interrupts. Interrupt latency in such devices can be kept to just a few cycles and must be predictable. Interrupts should also be nestable and prioritizable. In addition, it should be easy to enable and disable particular interrupts in real time.

With known DSPs interrupt handling occurs on either a per-processor basis or, in the case of a multithreaded processor, a per-thread basis. In some multi-threaded DSPs both per-processor and per-thread interrupt handling may exist. Unfortunately, with either per-processor or per-thread processing, unnecessary and undesirable complexities in both hardware design and programming result. With both per-processor and per-thread handling, even more complexities may arise.

Accordingly, a need exists for a method and system for processing interrupts in a multi-threaded DSP that avoids per-processor and per-thread hardware design and software programming complexities.

SUMMARY

Techniques for providing a shared interrupt control method and system for a digital signal processor are disclosed, which techniques improve both the operation of a digital signal processor and the efficient use of digital signal processor instructions for processing increasingly robust software applications for personal computers, personal digital assistants, wireless handsets, and similar electronic devices, as well as increasing the associated digital processor speed and service quality.

According to one aspect of the disclosed subject matter, there is provided a shared interrupt control method and system for a digital signal processor that receives in an interrupt register a plurality of interrupts of a statistically indeterminate interrupt type. The method and system associate a plurality of processing threads with the interrupt register for receiving the interrupt from the interrupt register. Then, the plurality of processing threads are masked so as to receive within each of the threads only ones of the plurality of interrupts of one or more predetermined types, thereby controlling on a per thread basis the processing of the plurality of interrupts according to the mask associated with a particular thread.

According to another aspect of the disclosed subject matter, there is provided a method and system for processing an external interrupt in a digital signal processor serving multiple threads, which method and system include associating an interrupt controller with a plurality of processor pipeline threads. The process further receives a first external interrupt in the interrupt controller, the first external interrupt being of an arbitrary type. Then, the process associates a first mask with the first external interrupt for enabling a set of the plurality of processor pipeline threads to accept the first external interrupt. The disclose subject matter then directs the first external interrupt to a first available processor pipeline thread capable of accepting the first external interrupt and the first mask. The method and system then allow receiving a second external interrupt in the interrupt controller. The second external interrupt may be of an arbitrary type and associates a second mask with the second external interrupt for enabling a set of the plurality of processor pipeline threads to accept the second external interrupt. The second external interrupt is directed to a next available processor pipeline thread capable of accepting the second external interrupt and the second mask. This process may be repeated and the disclosed system permits repeating the receiving steps, the associating steps, and the directing steps as external interrupts stream to the interrupt controller for processing by the digital signal processor, thereby providing to each of the set of the plurality of processor pipeline threads a flow of arbitrary external interrupts and associated masks in a distributed flow.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

Another example embodiment of the present invention is directed to a computer usable medium having computer readable program code means embodied therein for processing instructions on digital signal processor, the computer usable medium including computer readable program code means for receiving in an interrupt register a plurality of interrupts of a statistically indeterminate interrupt type, computer readable program code means for associating a plurality of processing threads with said interrupt register for receiving said interrupt from said interrupt register, computer readable program code means for masking at least a subset of said plurality of processing threads so as to receive within each of said threads within said subset only ones of said plurality of interrupts of one or more predetermined types, thereby controlling on a per thread basis the processing of said plurality of interrupts according to the mask associated with a particular thread. In an example, the computer readable program code means for masking said at least a subset of said plurality of processing threads may use a mask selected from a programmable set of masks corresponding to a predetermined set of interrupt types.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
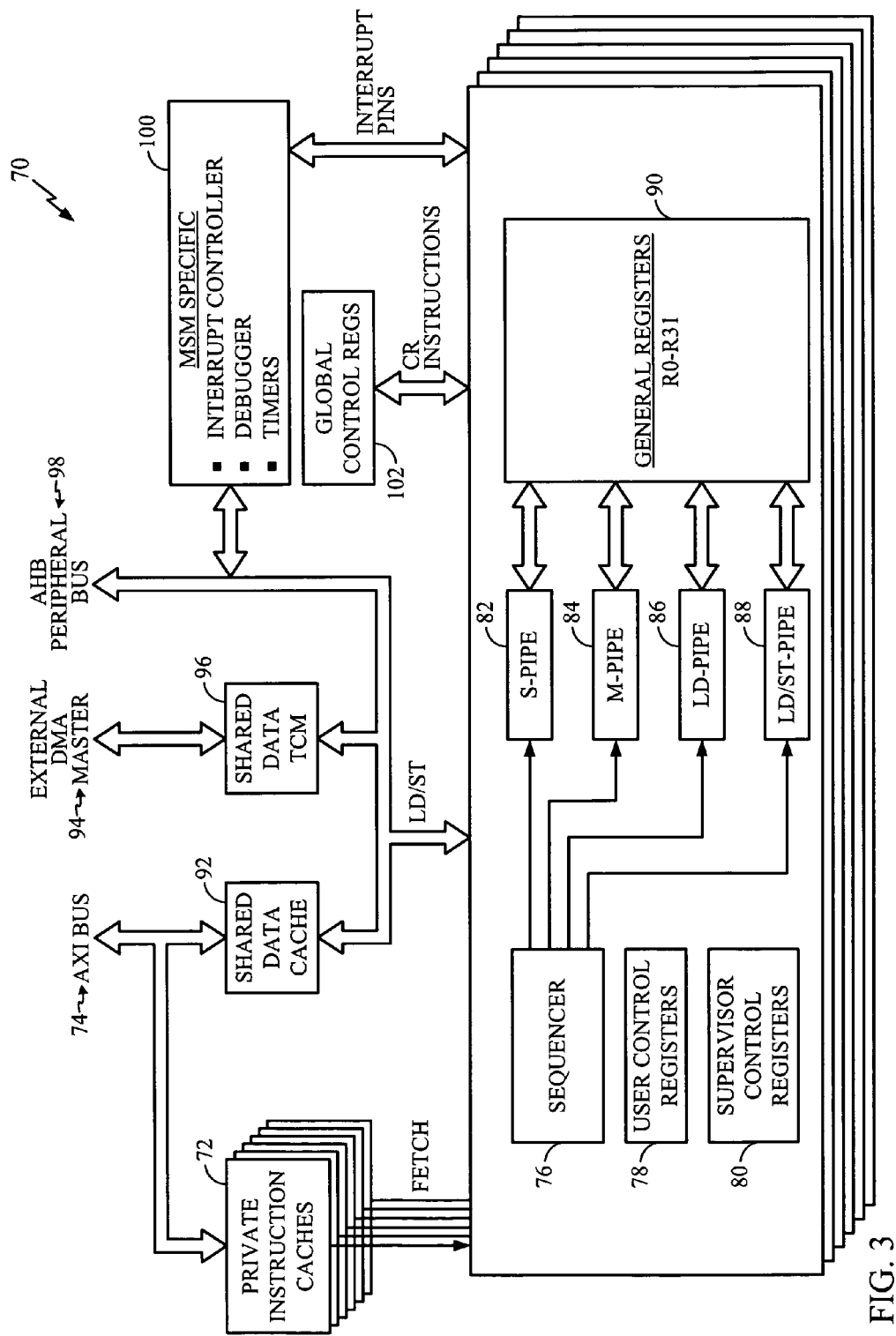
Figure 4:
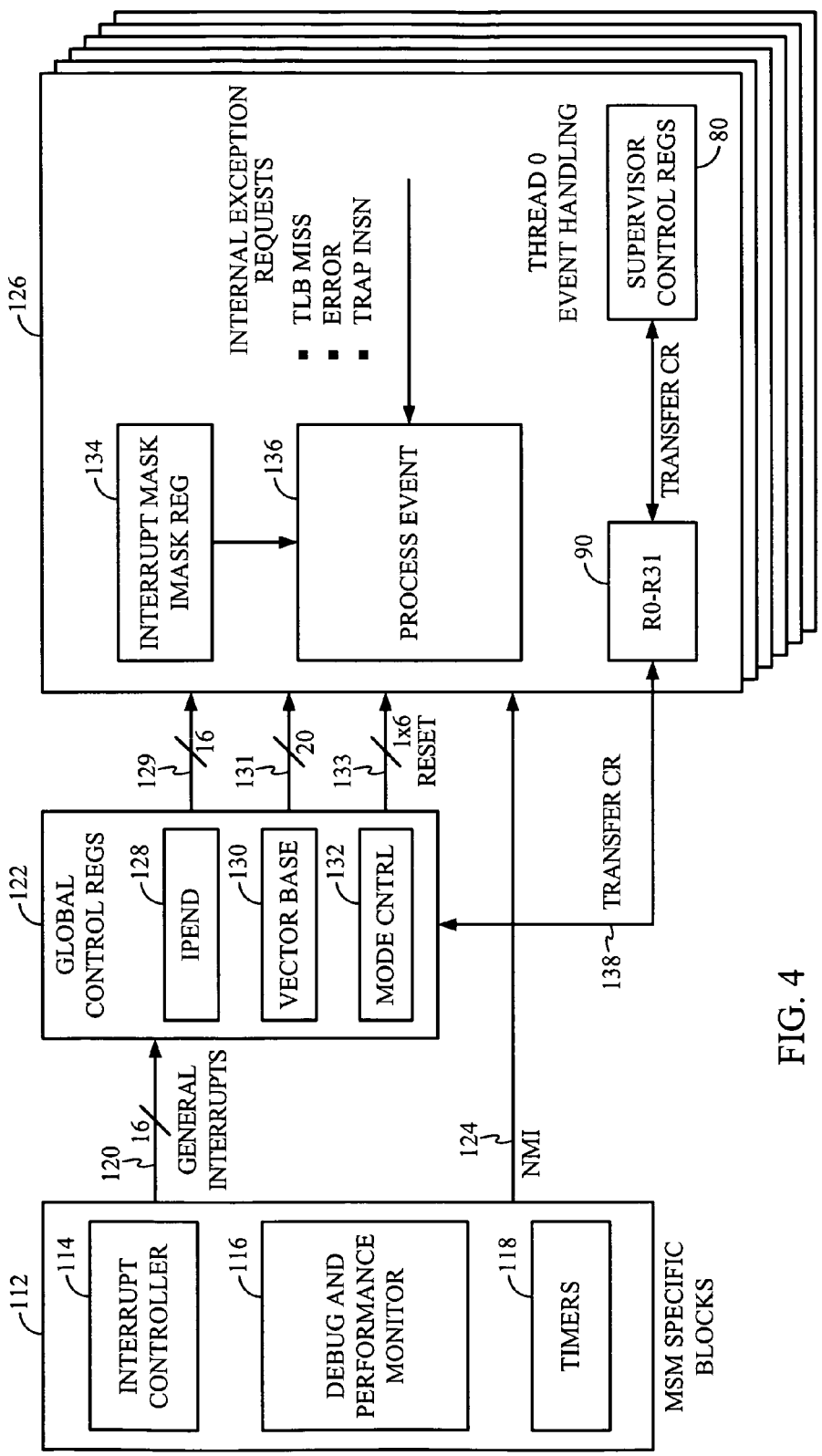
Figure 5:
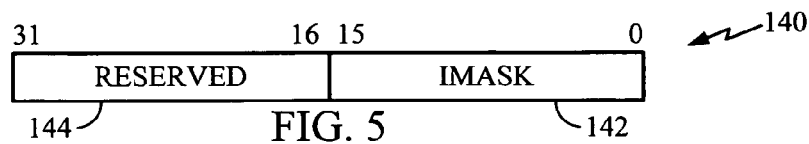
Figure 6:
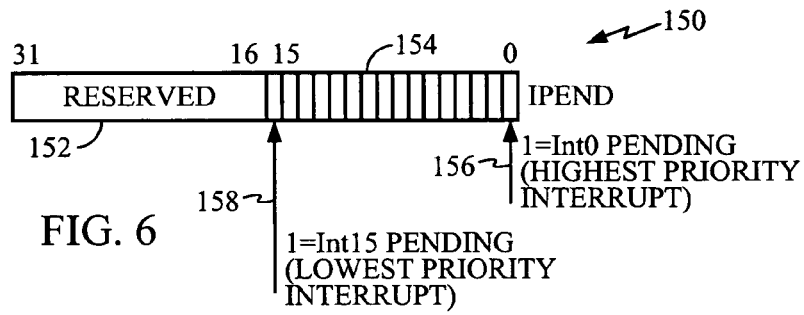
Figure 7:
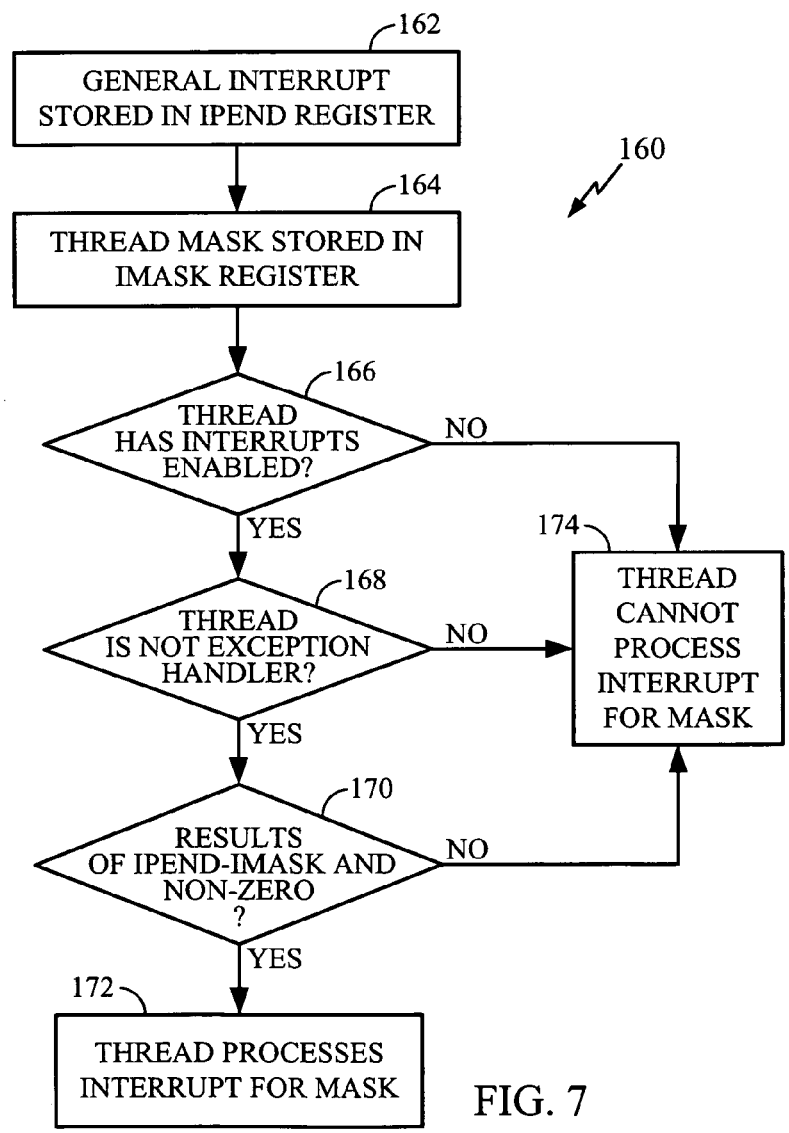

FIG. 3 provides an architecture block diagram of one embodiment of a digital signal processor providing the technical advantages of the disclosed subject matter;

FIG. 4 presents a functional block diagram of the event handling of the disclosure;

FIG. 5 shows a mask register format for use with the disclosed subject matter;

FIG. 6 presents a pending interrupt register format for use with the disclosed subject matter; and FIG. 7 provides a simplified flow diagram illustrating certain novel functions of the disclosed subject matter.

DETAILED DESCRIPTION OF THE SPECIFIC EMBODIMENTS

Figure 1:
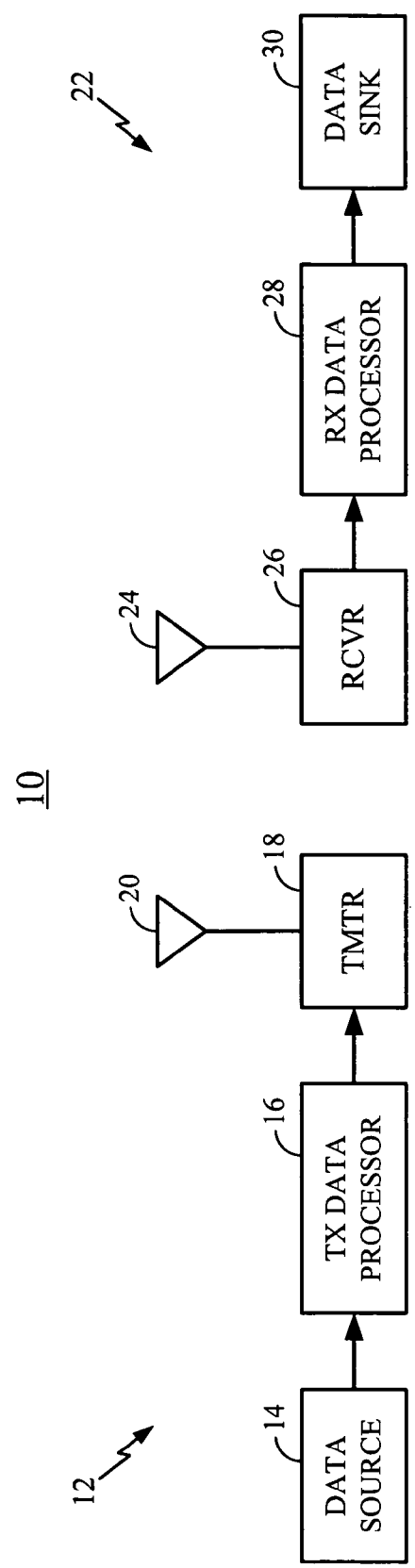
FIG. 1 is a simplified block diagram of a communications system that can implement the present embodiment.

The disclosed subject matter for a shared interrupt control method and system for digital signal processor has application literally in a digital signal processing application involving multi-thread processing of any type for which the benefits here presented may be advantageous. One such application appears in telecommunications and, in particular, in wireless handsets that employ one or more digital signal processing circuits. For the purpose of explaining how such a wireless handset may be used, FIG. 1 provides a simplified block diagram of a communications system 10 that can implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
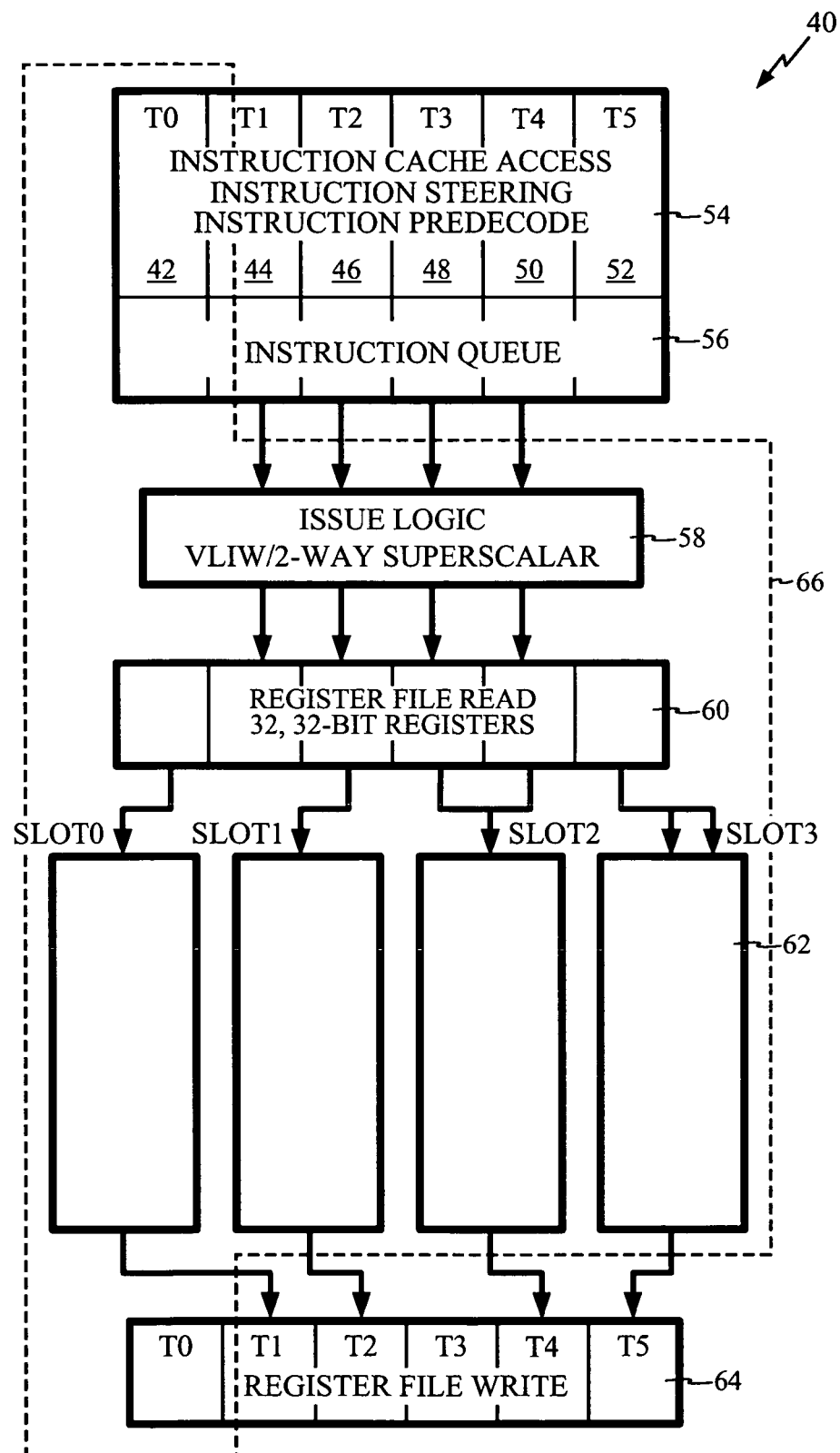
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. One more, emphasis is made that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for SLOT0 through SLOT3. Slot0 through SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. Patent Applications by M. Ahmed, et al, Ser. No. 11/080 239 and entitled "Variable Interleaved Multithreaded Processor Method and System" and Ser. No. 11/089.474 "Method and System for Variable Thread Allocation and Switching in a Multithreaded Processor."

FIG. 3, in particular, provides an architecture block diagram of one embodiment of a programming model for a single thread that may employ the teachings of the disclosed subject matter, including a shared interrupt control method and system for a digital signal processor. Block diagram 70 depicts private instruction caches 72 which receive instructions from AXI Bus 74, which instructions include mixed 16-bit and 32-bit instructions to sequencer 76, user control register 78, and supervisor control register 80 of threads T0:T5. Sequencer 76 provides hybrid two-way superscalar instructions and four-way VLIW instructions to S-Pipe unit 82, M-Pipe unit 84, Ld-Pipe 86, and Ld/St- Pipe unit 88. AXI Bus 74 also communicates with shared data cache 90 LD/ST instructions to threads T0:T5. With external DMA master 96 shared data TOM 98 communicates LD/ST instructions, which LD/ST instructions further flow to threads T0:T5. From AHB peripheral bus 100 MSM specific controller 102 communicates interrupt pins with T0:T5, including interrupt controller instructions, debugging instructions, and timing instructions. Global control registers 102 communicates control register instructions with threads T0:T5.

FIG. 4 presents a functional block diagram of the event handling of the disclosure. In the event handler architecture of FIG. 4, MSM specific blocks 112 include interrupt controller block 114, debug and performance monitor block 116, and timers block 118. MSM specific blocks 112 provides sixteen (16) general interrupts 120 to global control register 122 and non-maskable interrupts (NMI) 124 to event handling register 126. Global control register 122 includes IPEND register 128, vector base register 130, mode control register 132. From IPEND Register 128, 16 interrupt types 129 may go to event handling register 126. Vector base register 130 may send 20 interrupts 131 to event handling register 126, while mode control register 132 may provide a 1 .times.6 reset interrupt 133 to event handling register 126.

Event handling register 126 includes interrupt mask (IMASK) register 134, which provides masks data to process event register 136. Process event register 136 also receives internal exception requests, including TLB miss, error, and trap instruction requests. From global control registers 122 communications occur with general instructions registers (R0-R31) 90 and supervisor control register 80.

Therefore, interrupt processing with the disclosed subject matter includes three types of external interrupts, which include the soft reset interrupt 133, general maskable interrupts 120, 129, and 131, and the non-maskable interrupt 124. There are 16 maskable general interrupts that are shared between all the threads. When one of the 16 general interrupts 120 is raised, the corresponding bit in the global IPEND register 128 is set indicating that this interrupt is pending. Threads determine if they are able to take an interrupt by logical ANDing the global IPEND register with the local IMASK register.

If a thread T0:T5 (a) has interrupts enabled (IE=1) and (b) is not in an exception handler (EX=0), and (c) the result of (IPEND & IMASK) is non-zero, then an interrupt can be taken by that thread. The thread is then to be qualified to take the interrupt. In the case that more than one interrupt is pending, the priority is interrupt 0 (highest priority) to interrupt 15 (lowest priority). When a global interrupt comes in and is marked in the IPEND register, any of the six hardware threads may potentially service the interrupt. Of the set of hardware threads that are qualified for the interrupt, only one in the set will take the interrupt.

An important aspect of the disclosed subject matter benefits from the randomness of the qualified threads and maskable interrupts. That is, it cannot be determined which of the qualified threads will service the interrupt, because the process and the arrival of any given type of interrupt is random. The hardware will choose a thread from the qualified set, that thread will be interrupted, and the interrupt will then be cleared from IPEND register 128 so that no further threads will service that interrupt.

The software may direct particular interrupts to particular hardware threads with appropriate IMASK register 134 programming. For example, if only hardware thread T1:T5 has the IMASK bit for interrupt 6 set, then only hardware thread T1:T5 may receive that interrupt. When an interrupt is accepted by a thread, the machine will first clear the appropriate bit in IPEND register 128. Interrupts will then be disabled for the chosen thread, the exception bit will be set to indicate the thread is now in supervisor mode, the cause field in SSR will be filled with the interrupt number, and the machine will jump to the appropriate interrupt service routine.

One embodiment of FIG. 5 shows a mask register format 140 for use with the disclosed subject matter, which includes IMASK bits 0 through 15 for containing the particular mask. Bits 16 through 31 may be reserved for the present embodiment, while permitting the establishment. Mask register 140, therefore, contains 16-bit read/write field 142 for the mask allowing software to individually mask off each of the 16 external interrupts 120 from interrupt controller 114. If a particular bit in the mask field 142 is set, then that corresponding interrupt of the 16 external interrupts 120 is enabled and will be accepted by this thread. Alternatively, if the bit is clear, then that corresponding interrupt will not be accepted.

FIG. 6 presents an example of the IPEND register format 150 for one embodiment of the disclosed subject matter. In particular, IPEND register format 150 includes reserved field 152, which may be filled in later versions and IPEND register bit field 154 for containing the general interrupt type bits. In IPEND register bit field 154, bit 0 assumes a 1 value designating the highest priority interrupt type. The lowest priority interrupt type may be designated by bit 15 assuming the value 1. There may be other ways to designate different general interrupt types, all of which are consistent with the teaching of the claimed subject matter.

FIG. 7 provides flow diagram 160 for illustrating certain novel functions of the disclosed subject matter in determining that a particular thread T0:T5 may process a given interrupt type. Flow diagram 160 begins as step 162, at which point interrupt controller 114 provides at least a subset of 16 general interrupt types 120 to IPEND register 128 of general control register 122. At step 164, IMASK register 134 may store one or more masks for associating with the various threads T0:T5 of DSP 40. Thus, with IPEND containing one or more general interrupt types 120 and IMASK register 134 potentially storing a corresponding mask, flow diagram 160 first determines whether thread interrupt processing is enabled for a particular thread at query 166. Then, at query 168, the process determines that the particular thread is not operating as an exception handler. At query 170, after taking the logical AND of IPEND register 128 and IMASK register 134 a test of whether the result is non-zero occurs, thereby determining a match between the IPEND register 128 and IMASK register 134 contents. If a non-zero result occurs, then flow continues to step 172 at which the particular thread processes an interrupt corresponding to the particular mask. If the tests of any of queries 166, 168, or 170 fails, then processing goes to step 174 at which process flow 160 determines that the thread cannot process the interrupt(s) being examined.

Exemplary pseudo-code for performing one embodiment of the shared interrupt handling functions of the disclosed subject matter may be as here provided. The hardware behavior for servicing an interrupt is illustrated in the following pseudo-code:

```
// start can be any random # 0-5
// loop over all threads
for (thread=NEXT(start); thread!=start; thread=NEXT(thread);) {
// loop over all the interrupts in priority order
for (IntNum=0; IntNum<16; IntNum++) {
// if the thread is qualified for this interrupt
if ((IPEND[IntNum] & IMASK[thread][IntNum]) &&      IE[thread])
{
// take the interrupt
IPEND[IntNum]=0; // the Interrupt is serviced
EX[Thread]=1; // put thread in supervisor mode
ELR[Thread] = PC; // save return PC
SSR[Thread].CAUSE = IntNum;
PC[Thread] = (EVB)|((IntNum+16)<<2) // jump to       ISR
return; // done for this cycle
}
}
}
```

The present embodiment may not support automatic nesting of interrupts in DSP 40 hardware. However, nesting may be performed under software control by first saving all relevant information to the supervisor stack upon receiving an interrupt. Then, the process may re-enable interrupts, perform the relevant ISR task, then disable interrupts, restore to context, and return. An example of such a process may be for following:

```
ISR_w_nesting:
CRSWAP (R29,SGPR0) // swap user stack pointer and supervisor stack
ALLOCFRAME(#32) // saves FP,LR,sets FP, adds to SP
MEMD(SP+#0) = R1:0 // save some user registers on supervisor stack
R0=ELR
R1=SSR
MEMD(SP+#8) = R1:0 // save SSR:ELR on supervisor stack
CRSWAP (R29,SGPR0) // swap back user and supervisor stack pointers
// at this point all context is saved on the supervisor stack
// and SGPR0 is the adjusted supervisor stack pointer.
R0 = #0x4 // 100b
R1 = insert(r1,#3,#16) // set UM=0, EX=0, IE=1
SSR = R1 // now in supervisor mode, interrupts enabled
.. //do ISR task // ....
// now, we want to restore and return
DI // disable interrupts
CRSWAP (R29,SGPR0) // swap user stack pointer and supervisor stack
R1:0 = MEMD(SP+#8) // restore SSR:ELR
ELR=R0
SSR=R1
R1:0 = MEMD(SP+#0) // restore user R1:0
DEALLOCFRAME
CRSWAP (R29,SGPR0) // swap back user and supervisor stack pointers
RTE // return from exception, sets EX=0
```

A software interrupt instruction (SWI) causes a specified interrupt to be posted in IPEND register 128. The purpose of this instruction is to allow threads to interrupt one another. When one thread executes a SWI instruction, it is processed through the normal external interrupt mechanism. A random hardware thread from the set of qualified threads will be interrupted in response to the SWI instruction. This instruction can be used to construct software abstractions such as fork( ), join( ), etc.

The soft reset interrupt is non-maskable and operates on a per-thread basis. One reset interrupt input exists for each of the six threads. The subsystem interrupt controller can individually reset threads. The exact methods for triggering a soft reset interrupt to a particular thread are interrupt controller specific, however, one way to cause a soft reset exception is to invoke a transition from OFF mode on supervisor mode. Upon receiving the non-maskable soft reset interrupt, the thread will clear the SSR register, and jump to the reset vector.

In the case a non-maskable interrupt (NMI) 124, event handling circuitry 110 may choose at random one of the six threads T0:T5 and deliver the NMI 124 to that thread. The chosen thread then will perform the following actions:

```
ELR = PC // save PC in the exception link register
SSR[EX] = 1 // set exception bit in SSR
SSR[CAUSE] = #NMI // set reason to NMI
PC = (EVB) | (1<<2)
```

Note that any NMI 124 should not be considered a recoverable interrupt. If a thread T0:T5 is inside an event handler and an NMI 124 occurs, the ELR and CAUSE registers will be overwritten making return to the original interrupt or exception-causing code impossible.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for processing interrupts arising in a multi-threaded processor, comprising the steps of:
receiving in an interrupt register a plurality of interrupts, each of the plurality of interrupts corresponding to an external interrupt of a statistically indeterminate interrupt type;
associating a plurality of processing threads with said interrupt register for receiving at least one of said plurality of interrupts from said interrupt register;
determining, for each of the plurality of processing threads, that the processing thread can take one of the plurality of interrupts if the processing thread has enabled interrupt processing and the processing thread is not an exception handler configured to handle internal exceptions; and
masking, based on the determining step, at least a subset of said plurality of processing threads so as to receive within each of said threads within said subset only ones of said plurality of interrupts of one or more predetermined types and exclude from each of said threads within said subset ones of said plurality of interrupts of a different one or more predetermined types,
wherein the statistically indeterminate interrupt type of the received plurality of interrupts is determined from the masking step, thereby controlling on a per thread basis the processing of said plurality of interrupts according to the mask associated with a particular thread.

2. The method of claim 1, further comprising the step of masking said at least a subset of said plurality of processing threads using a mask selected from a programmable set of masks corresponding to a predetermined set of interrupt types.

3. The method of claim 1, further comprising the step of determining said interrupt to correspond to a mask using a logical AND of said interrupt within said interrupt register with the contents of a mask register containing said mask and associating with a thread.

4. The method of claim 1, further comprising the step of determining a priority of processing a mask associated with one of the processing threads for an associated interrupt register in the event that said associated interrupt register contains a plurality of said masks.

5. The method of claim 1, further comprising the steps of clearing a received one of said interrupts from said interrupt register in the event that a thread processes said one of said interrupts.

6. The method of claim 5, further comprising the step of disabling said thread processing from said one of said interrupts during the processing of said interrupt.

7. The method of claim 1, further comprising the steps of further comprising the step of nesting said processing of said plurality of interrupts using a plurality of software instructions.

8. The method of claim 1, further comprising the step of receiving at random for processing in any of said plurality of threads any of said interrupts having the property of being non-maskable.

9. A system for operation in association with a digital signal processor for processing interrupts arising in a multi-threaded processor, comprising:
an interrupt register associated with said processor for receiving a plurality of interrupts each corresponding to an external interrupt of a statistically indeterminate interrupt type;
thread control circuitry for associating a plurality of processing threads with said interrupt register, such that at least one of the plurality of processing threads is configured to receive at least one of said plurality of interrupts from said interrupt register;
an event handling register for determining, for each of the plurality of processing threads, that the processing thread can take one of the plurality of interrupts if the processing thread has enabled interrupt processing and the processing thread is not an exception handler configured to handle internal exceptions; and
a mask register for masking, based on the determiation, least a subset of said plurality of processing threads so as to receive within each of said threads within said subset only ones of said plurality of interrupts of one or more predetermined types and exclude from each of said threads within said subset ones of said plurality of interrupts of a different one or more predetermined types,
wherein the statistically indeterminate interrupt type of the received plurality of interrupts is determined from the masking, thereby controlling on a per thread basis the processing of said plurality of interrupts according to the mask and the interrupt type.

10. The system of claim 9, wherein said mask register further comprises circuitry and instructions for masking said at least a subset of said plurality of processing threads using a mask selected from a programmable set of masks corresponding to a predetermined set of interrupt types.

11. The system of claim 9, wherein said processor further comprises processing circuitry and instructions for determining said interrupt to correspond to a mask using a logical AND of said interrupt within said interrupt register with the contents of a mask register containing said mask and associating with a thread.

12. The system of claim 9, wherein said processor further comprises processing circuitry and instructions determining a priority of processing a mask associated with one of the processing threads for an associated interrupt register in the event that said associated interrupt register contains a plurality of said masks.

13. The system of claim 9, wherein said interrupt register processor further comprises circuitry and instructions for clearing a received one of said interrupts from said interrupt register in the event that a thread processes said one of said interrupts.

14. The system of claim 13, wherein said processor further comprises circuitry and instructions for disabling said thread from processing said one of said interrupts during the processing of said interrupt.

15. The system of claim 9, wherein said processor further comprises processing instructions for nesting said processing of said plurality of interrupts.

16. The system of claim 9, wherein said processor further comprises processing circuitry and instructions for receiving at random for processing in any of said plurality of threads any of said interrupts having the property of being non-maskable.

17. A digital signal processor for operation in support of a personal electronics device, said digital signal process comprising means for shared control processing means for processing a predetermined set of interrupt types in multi-threaded processing, said shared control processing means comprising:

means for associating an interrupt controller with a plurality of processor pipeline threads;
   means for receiving a first external interrupt in said interrupt controller, said first external interrupt being of an arbitrary type;
   means for associating a first mask with said first external interrupt for enabling a set of said plurality of processor threads to accept said first external interrupt;
   means for directing said first external interrupt to a first available processor pipeline thread capable of accepting said first external interrupt and said first mask, the first available processor pipeline thread determined if the first available processor pipeline thread has enabled interrupt processing and the first available processor pipeline thread is not an exception handler configured to handle internal exceptions;
   means for receiving a second external interrupt in said interrupt controller, said second external interrupt being of an arbitrary type;
   means for associating a second mask with said second external interrupt for enabling a set of said plurality of processor pipeline threads to accept said second external interrupt;
   means for directing said second external interrupt to a next available processor pipeline thread capable of accepting said second external interrupt and said second mask, the next available processor pipeline thread determined if the next available processor pipeline thread has enabled interrupt processing and the second available processor pipeline thread is not an exception handler configured to handle internal exceptions;
   means for repeating said receiving steps, said associating steps, and said directing steps as external interrupts stream to said interrupt controller for processing by said digital signal processor, thereby providing to each of said set of said plurality of processor pipeline threads a flow of arbitrary external interrupts and associated masks in a distributed flow.

18. The digital signal processor system of claim 17, further comprising means for masking a subset of said plurality of processor threads using a mask selected from a programmable set of masks corresponding to a predetermined set of interrupt types.

19. The digital signal processor system of claim 17, further comprising means for determining said interrupt to correspond to a mask using a logical AND of said interrupt within said interrupt register with the contents of a mask register containing said mask and associating with a thread.

20. The digital signal processor system of claim 17, further comprising means determining a priority of processing one of said masks within said interrupt register in the event that said interrupt register contains a plurality of said masks.

21. The digital signal processor system of claim 17, further comprising means for clearing a received one of said interrupts from said interrupt register in the event that a thread processes said one of said interrupts.

22. The digital signal processor system of claim 17, further comprising means for disabling said thread processing from said one of said interrupts during the processing of said interrupt.

23. The digital signal processor system of claim 17, further comprising means for nesting said processing of said plurality of interrupts using a plurality of software instructions.

24. The digital signal processor system of claim 23, further comprising means for receiving at random for processing in any of said plurality of threads any of said interrupts having the property of being non-maskable.

25. A computer usable medium having computer readable program code means embodied therein for processing instructions on digital signal processor, the computer readable program code means comprising:

computer readable program code means for receiving in an interrupt register a plurality of interrupts each corresponding to an external interrupt of a statistically indeterminate interrupt type;
   computer readable program code means for associating a plurality of processing threads with said interrupt register for receiving at least one of said plurality of interrupts from said interrupt register;
   computer readable program code means for determining, for each of the plurality of processing threads, that the processing thread can take one of the plurality of interrupts if the processing thread has enabled interrupt processing and the processing thread is not an exception handler configured to handle internal exceptions; and
   computer readable program code means for masking, based on the determination, at least a subset of said plurality of processing threads so as to receive within each of said threads within said subset only ones of said plurality of interrupts of one or more predetermined types and exclude from each of said threads within said subset ones of said plurality of interrupts of a different one or more predetermined types,
   wherein the statistically indeterminate interrupt type of the received plurality of interrupts is determined from the means for masking step, thereby controlling on a per thread basis the processing of said plurality of interrupts according to the mask associated with a particular thread.

26. The computer usable medium of claim 25, further comprising computer readable program code means for masking said at least a subset of said plurality of processing threads using a mask selected from a programmable set of masks corresponding to a predetermined set of interrupt types.

* * * * *

UNITED STATES PATENT AND TRADEMARK OFFICE
CERTIFICATE OF CORRECTION

PATENT NO.        : 7,702,889 B2
APPLICATION NO.   : 11/253906
DATED             : April 20, 2010
INVENTOR(S)       : Codrescu et al.

It is certified that error appears in the above-identified patent and that said Letters Patent is hereby corrected as shown below:

Column 9, line 37, claim 1: "the mask" to read as --a mask--

Column 9, line 60, claim 7: delete "further comprising the steps of"

Column 10, line 29, claim 9: "the mask" to read as --a mask--

Column 10, line 40, claim 11: "a mask register" to read as --the mask register--

Column 12, line 47, claim 25: "the mask" to read as --a mask--

Signed and Sealed this
Twenty-seventh Day of March, 2012

David J. Kappos
*Director of the United States Patent and Trademark Office*